3,850,889
ORDERED POLYMERIC AMIDES
Ray McKinney, Jr., Raleigh, and William L. Hofferbert, Jr., Durham, N.C., assignors to Monsanto Company, St. Louis, Mo.
No Drawing. Filed Dec. 29, 1972, Ser. No. 319,134
Int. Cl. C08g 20/20
U.S. Cl. 260—78 R          2 Claims

ABSTRACT OF THE DISCLOSURE

Novel polymeric amides are provided by condensing an aromatic diacyl halide with a pre-formed diamine having a central alkylene radical joined to amine terminated arylene units by sulfonamido linkages. The recurring structural units of the polymer are ordered, i.e., the alkylene and arylene radicals are linked in a regular, consistent manner which does not deviate along the polymer chain. The novel polymers are thermoplastic and extrudable from the melt. Thus, fibers and film may be fabricated from the polymeric material by conventional melt extrusion methods.

BACKGROUND OF THE INVENTION

The high level of strength, low moisture sensitivity and other exceptional physical properties of ordered wholly aromatic polyamides, such as described in U.S. Pat. 3,232,910, are well known. These polymers are not, however, thermoplastic because their melting points are near or above their decomposition temperatures. This, of course, precludes the use of the convenient melt extrusion methods conventionally employed in the fabrication of fibers and film. Moreover, because of their inverse solubility-temperature relationships in known good solvents, e.g., dimethyl acetamide and dimethyl sulfoxide, plasticized-melt extrusion is also not possible, i.e., because of polymer-diluent phase separation at elevated temperatures.

Attempts have been made to confer thermoplastic properties with an attending melt extrusion capability to the wholly aromatic polyamides by incorporating aliphatic moieties into the polymer chain. That is, it was thought that upon combining both aromatic and aliphatic polyamide segments in the form of a copolymer, a product would result having the thermoplastic characteristic of the melt-extrudable nylons together with the highly desired properties of the aromatic polyamides. A polymer composition of this type is described in U.S. Pat. 3,453,244. Although such copolyamides offer certain advantages, as a practical matter, they are not amenable to the production of fiber and film by melt-extrusion methods. This is because the melting points and/or the melt viscosities are much too high to accommodate successful extrusion of the melt under present practices. Moreover, instability of the melts at elevated temperatures precludes the use of additional heating at higher temperatures to reduce melt viscosity.

Accordingly, it is an object of this invention to provide novel aromatic-aliphatic copolyamides having relatively low melting points and melt viscosities.

It is another object of this invention to provide an aromatic-aliphatic copolyamide which is thermoplastic.

It is a still further object of this invention to provide an aromatic-aliphatic copolyamide from which fibers and filaments may be formed by extrusion from the melt.

SUMMARY OF THE INVENTION

The foregoing objects are accomplished in accordance with this invention by providing a linear fiber and film forming polymer consisting essentially of recurring units having the formula:

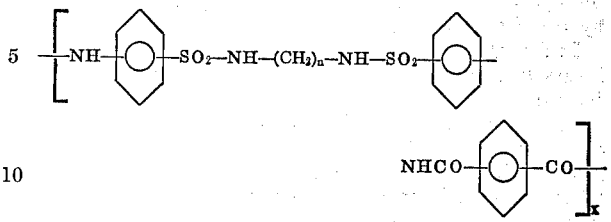

wherein $n$ is an integer of from 6 to 12 and $x$ represents a number large enough to provide fiber and film forming polymers. The orientation of the phenylene radicals may be meta or para with ortho orientation not being contemplated. Thus, the orientation may be all meta, all para or mixed meta and para. An all meta orientation is preferred. In an especially preferred embodiment the orientation is all meta and the number represented by the symbol $n$ in the above formula is 6.

DETAILED DESCRIPTION

The novel polymers of this invention are obtained through polymerization of an aromatic diacyl halide with a unique aromatic/aliphatic diamine of the following structure:

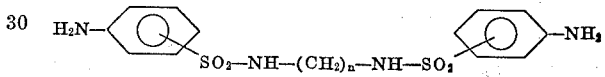

where: $n$ is an integer of from 6–12.

The orientation on the terminal phenylene radicals should be the same, i.e., either meta or para. One should not be meta and the other para, since this would destroy the symmetry of the diamine and reduce the desired crystallinity of the ultimate polymer.

Briefly, the diamine monomers are prepared by first reacting an appropriate aliphatic diamine with m- or p-nitrobenzene sulfonyl chloride in a molar ratio of about 1:2. The dinitro compound resulting is then reduced to give a diamine corresponding to the formula above. Reduction of the dinitro intermediate to the diamine may be effected by use of catalytic reducing methods such as those involving the use of a palladium on charcoal catalyst and employing a Parr hydrogenation unit.

As noted, the other monomeric material which is required for preparing the novel polymers of this invention is an aromatic diacyl halide. Isophthaloyl chloride or bromide can be used. The aromatic ring may be substituted by groups which do not interfere with the polymerization process, e.g., alkyl, alkoxy and nitro groups. Examples of such compounds include 4,6-dimethyl 5 propyl isophthaloyl chloride, 2,5 dimethoxy isophthaloyl chloride, 5-nitro isophthaloyl chloride and the like. Terephthaloyl halides are also suitable and may contain non-functional substituents as noted above for the isophthaloyl halides. The functional groups of the aromatic diacyl halides may be oriented para or meta to each other. They need not necessarily correspond in orientation to the diamine monomer used in forming the ultimate polymer. Although as pointed out hereinabove, the all meta polymer is preferred.

The polymeric products, obtained in accordance with this invention, are produced by employing either of the techniques of solution polymerization or of interfacial polymerization. In the solution polymerization technique, the monomers are dissolved separately in the same solvent or in miscible solvents. Suitable solvents include among others dimethylacetamide, 1-methyl-2-pyrrolidone, 1,5-dimethyl-2-pyrrolidone and the like, with dimethylacetamide being of preference. In practice, the diamine is first dissolved and the resulting solution cooled to between 0° C. and —20° C. after which the diacyl halide is added either as a solid or in a solution of one of the afore-mentioned solvents. The mixture is then stirred for a period of time until polymerization is substantially complete as evidenced by the rise in viscosity of the solution.

In the interfacial polymerization, one of the monomers is dissolved in an organic solvent, which is a monosolvent for the polymer, and the other monomer is dispersed in an aqueous phase with the aid of a suitable emulsifier and a proton acceptor which serves to neutralize the acid released during the polymerization reaction. The proton acceptors include materials such as sodium carbonate, magnesium carbonate and tertiary amines, such as triethylamine, trimethylamine and pyridine. The organic solution and the aqueous dispersion are then mixed and the polymer is formed at the interface between the organic and the aqueous phases.

The proportion of monomers employed in either type of polymerization will, of course, depend upon the molecular weight desired in the resulting polymer. However, when fiber and film end-uses are contemplated, it is generally preferred to polymerize the monomers to the highest possible molecular weight in order to achieve the best mechanical properties. This is accomplished when substantially equimolar quantities of the monomers are employed or a slight excess of diamine.

Both the solution and interfacial polymerizations are preferably conducted at low temperatures such as —20° C. to 0° C., although higher temperatures are operable. The pressure is normally atmospheric, although super or sub-atmospheric pressures may be used.

The following examples will serve to illustrate certain preferred embodiments of the invention in greater detail.

EXAMPLE 1

This example illustrates the preparation of the compound:

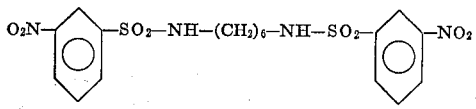

This dinitro compound is an intermediate to the diamine monomer used in forming a preferred polymer of this invention.

The compound is prepared interfacially from m-nitrobenzene sulfonyl chloride and hexamethylene diamine (HMD). First, 4.64 grams (0.04 mole) of HMD was dissolved in 50 ml. water. The HMD solution consisting of 50 grams ice and 50 ml. water was placed in a Waring® blender and mixed. A solution of 4.8 grams $NaCO_3$ (0.04 mole), an excess added to correct for the carbonate hydrate, in 25 ml. of deionized water was added. Next a solution of 17.85 grams (0.0805 mole), slight excess of sulfonyl chloride, in 50 ml. of tetrahydrofuran (THF) was added. The reaction mixture was stirred for 15 minutes then transferred to a beaker and stirred while heating to 60° C. to vaporize the THF. The product was separated by filtration and washed twice; each time with one liter of 60° C. water. Finally, the product was again separated by filtration and dried in an air circulating oven at 50° C. The dry product weighed 17.2 grams and had a melting point in the range: 168–172° C. (yellow melt). The product was recrystallized from a dimethyl acetamide (DMAc) -water solution. Seventeen grams of the compound was dissolved in 40 ml. of warm DMAc and water was added dropwise until crystals began to form. A total of 10 ml. of hot water was added. After cooling the crystals were separated by filtration, washed with water and dried. The dry crystals weighed 15.7 grams and melted at 169–172° C. (clear melt).

EXAMPLE 2

This example illustrates the hydrogenation of the dinitro compound of Example 1 to produce the corresponding diamine having the formula:

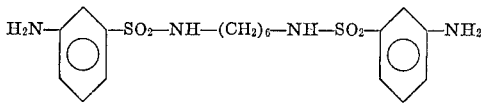

The hydrogenation was carried out in a Parr® bomb hydrogenator in accordance with the following procedure. Twelve (12.2 grams) (0.25 mole) of the dinitro compound, 0.8 grams of 5% palladium on charcoal and 120 ml. of DMAc were placed in a pressure bottle. The bottle was flushed with nitrogen, attached to the Parr® bomb shaker and swept with hydrogen. The system was then pressurized with hydrogen to 40 p.s.i. and agitated (shaken). The total hydrogen take up was 12 p.s.i. (theory=12). The reaction mixture was then filtered to remove the catalyst. The filtrate had a light brown color. A total of 600 ml. of water was added to the stirred filtrate. The precipitated product was separated by filtration, washed with water and dried. The dry product was light brown in color and melted: 180–183° C. The weight of the product was 8.7 grams.

EXAMPLE 3

This example illustrates the polymerization of the diamine of Example 2 with isophthaloyl chloride to produce a polymer having regularly recurring structural units of the following formula:

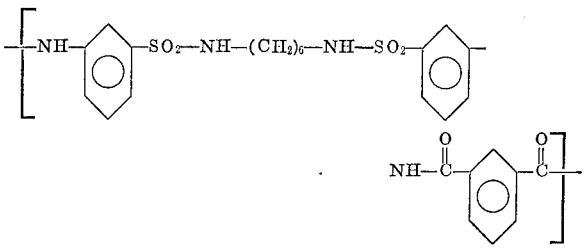

The diamine of Example 2, 0.421 gram (0.001 mole), was added to 2.2 ml. of DMAc in a dry flask and stirred until dissolution occurred. The flask was equipped with a dry nitrogen sweep. The solution was cooled to —10° C. and 0.203 gram (0.001 mole) of isophathoyl chloride added. After 30 minutes the clear polymer solution was warmed to room temperature. The precipitated polymer had a melting point of 160° C. and an inherent viscosity of 0.76 at 25° C. at a concentration of 0.5% polymer in dimethylformamide (DMF). Fibers were drawn from the melt at a temperature of 170° C.

EXAMPLE 4

An ordered polymer was prepared in accordance with the procedures as set forth in Examples 1, 2 and 3 above, the sole exception being that octamethylene diamine was used in preparing the dinitro intermediate rather than hexamethylene diamine as in Example I. This, of course, resulted in a polymer having an alkylene moiety of 8 carbons in length rather than 6. The polymer obtained had a melting point of 150° C. Fibers were drawn from the melt at a temperature of 165° C.

EXAMPLE 5

Again an ordered polymer was prepared in accordance with the procedures of Examples 1, 2 and 3 with the sole exception being that dodecamethylene diamine was used in the preparation of the dinitro intermediate rather than hexamethylene diamine as shown in Example I. Thus, the resulting polymer had an alkylene segment containing 12 carbon atoms. The polymer product so obtained had a melting point of 140° C. Fibers could be drawn from the melt at a temperature of 180° C.

In order to determine the significance on polymer melting behavior of the sulfonamido, —SO₂NH—, groups which link the alkylene radical to arylene radicals, comparative tests were made against polymers which differed only in this linkage. That is, the conventional carbonamide linkage, —CONH—, was substituted for the sulfonamido groups in the control polymers.

TABLE I.—COMPARATIVE POLYMER STRUCTURE/MELTING BEHAVIOR $$\left[-NH-\bigcirc-(A)-(CH_2)_n-(A)-\bigcirc-NH-\overset{O}{\underset{\|}{C}}-\bigcirc-\overset{O}{\underset{\|}{C}}-\right]$$

| | Structure | | Melting behavior (° C.) | |
|---|---|---|---|---|
| | A | n | Melting point | Fiber [a] draw temp. |
| Polymer sample: | | | | |
| 1 | —CONH— | 6 | 260 | 275 |
| 2 | —CONH— | 8 | 250 | 250 |
| 3 | —CONH— | 12 | 235 | 270 |
| 4 | —SO₂NH— | 6 | 160 | 170 |
| 5 | —SO₂NH— | 8 | 150 | 165 |
| 6 | —SO₂NH— | 12 | 140 | 180 |

[a] Temperature at which a filament can be drawn from the polymer melt pool.

As is clearly evident from the data in the above table, the sulfonamido linkages which are present in an ordered manner in the polymer impart a significant lowering of the polymer melting point. There is a further surprising advantage in that it has been observed that this relatively low melting point is transient in nature. That is, it has been found that upon cooling the melt and then reheating, a new and elevated melting point is observed. For example, the ordered copolymer described previously in Example 3 melts to a clear product at 160° C. whereupon cooling and reheating, the melting point becomes approximately 230° C. The mechanism for this phenomenon is not clearly understood. However, it offers substantial advantage in that the polymers are melt processable at reasonable temperatures, but once processed they possess resistance to heat, or in other words, a high heat distortion temperature.

We claim:

1. A linear fiber and film forming polymer consisting essentially of regularly recurring structural units having the formula:

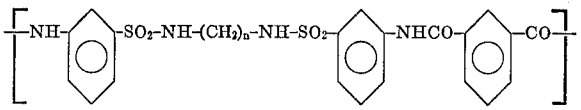

wherein $n$ is an integer of from 6 to 12.

2. A linear fiber and film forming polymer consisting essentially of regularly recurring structural units having the formula:

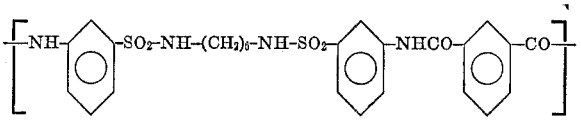

References Cited
UNITED STATES PATENTS

| | | | |
|---|---|---|---|
| 3,403,200 | 9/1968 | Randall | 260—78 R |
| 3,453,244 | 7/1969 | Preston | 260—78 R |

HAROLD D. ANDERSON, Primary Examiner

U.S. Cl. X.R.

260—30.2, 32.6 N, 47 CZ, 556 B